United States Patent
Grimstrup et al.

(10) Patent No.: US 10,244,033 B2
(45) Date of Patent: Mar. 26, 2019

(54) METHOD FOR PROVIDING DATA FROM A RESOURCE WEAK DEVICE TO A COMPUTER CLIENT

(71) Applicant: NABTO APS, Arhus N (DK)

(72) Inventors: Peter Grimstrup, Beder (DK); Ulrik Gammelby, Aarhus C (DK)

(73) Assignee: Nabto Aps, Arhus N (DK)

( * ) Notice: Subject to any disclaimer, the term of this patent is extended or adjusted under 35 U.S.C. 154(b) by 0 days.

(21) Appl. No.: 15/046,772

(22) Filed: Feb. 18, 2016

(65) Prior Publication Data

US 2016/0164949 A1 Jun. 9, 2016

Related U.S. Application Data

(63) Continuation-in-part of application No. 13/636,266, filed as application No. PCT/DK2011/050092 on Mar. 21, 2011.

(51) Int. Cl.
*H04L 12/28* (2006.01)
*H04L 29/08* (2006.01)
(Continued)

(52) U.S. Cl.
CPC ............ *H04L 67/025* (2013.01); *G06F 17/30* (2013.01); *H04L 12/28* (2013.01); *H04L 12/403* (2013.01);
(Continued)

(58) Field of Classification Search
CPC .................................................... H04L 67/025
(Continued)

(56) References Cited

U.S. PATENT DOCUMENTS

| 6,112,246 A | 8/2000 | Horbal et al. |
| 7,269,664 B2 | 9/2007 | Hutsch et al. |

(Continued)

FOREIGN PATENT DOCUMENTS

| CN | 1468409 A | 1/2004 |
| JP | 2004064727 A | 2/2004 |

(Continued)

OTHER PUBLICATIONS

Japanese First Office Action for corresponding JP Patent Application No. 2013-500332 dated Feb. 10, 2015 and English translation thereof.

(Continued)

*Primary Examiner* — David R Lazaro
*Assistant Examiner* — Zia Khurshid
(74) *Attorney, Agent, or Firm* — Harness, Dickey & Pierce, P.L.C.

(57) ABSTRACT

A method and a system for providing data from a resource weak device to a computer client connected to the resource weak device, allowing the computer client to receive and send information from and to the resource weak device, and a data stream between the resource weak device and the computer client is mapped from a low level data format to a high level data format by a mapping function in the computer client, the mapping function comprises static data relating to the resource weak device and the high level data format link to the static data, the second high level data format is used for displaying the data from the resource weak device at the computer client.

23 Claims, 5 Drawing Sheets

(51) Int. Cl.
*G06F 17/30* (2006.01)
*H04L 29/12* (2006.01)
*H04L 12/403* (2006.01)

(52) U.S. Cl.
CPC .......... *H04L 61/1511* (2013.01); *H04L 67/02* (2013.01); *H04L 67/04* (2013.01); *H04L 67/2823* (2013.01); *H04L 61/305* (2013.01); *H04L 67/125* (2013.01)

(58) Field of Classification Search
USPC ........................................................ 709/226
See application file for complete search history.

(56) References Cited

U.S. PATENT DOCUMENTS

| | | | |
|---|---|---|---|
| 7,293,238 | B1 | 11/2007 | Brook et al. |
| 2001/0037461 | A1 | 11/2001 | Conrath |
| 2002/0156866 | A1 | 10/2002 | Schneider |
| 2002/0184301 | A1 | 12/2002 | Parent |
| 2004/0016242 | A1 | 1/2004 | Song et al. |
| 2004/0102683 | A1* | 5/2004 | Khanuja ............... A61B 5/0002 600/300 |
| 2004/0167689 | A1 | 8/2004 | Bromley et al. |
| 2006/0077941 | A1 | 4/2006 | Alagappan et al. |
| 2007/0233881 | A1 | 10/2007 | Nochta et al. |
| 2008/0004904 | A1* | 1/2008 | Tran ..................... A61B 5/0006 705/2 |
| 2008/0215669 | A1* | 9/2008 | Gaddy ............... H04L 29/12528 709/203 |
| 2009/0006596 | A1* | 1/2009 | Dinakaran ............... H04L 12/66 709/223 |
| 2009/0248797 | A1 | 10/2009 | Chiba et al. |
| 2010/0234718 | A1* | 9/2010 | Sampath ................ A61B 5/411 600/407 |
| 2010/0318683 | A1* | 12/2010 | Lange ....................... G06F 8/52 709/246 |

FOREIGN PATENT DOCUMENTS

| | | |
|---|---|---|
| JP | 2004227215 A | 8/2004 |
| JP | 2009164665 A | 7/2009 |
| WO | WO-2009103291 A1 | 8/2009 |

OTHER PUBLICATIONS

State Intellectual Property Office of People's Republic of China Notification of First Office Action for corresponding CN Patent Application No. 201180015424.X dated Oct. 10, 2014 and English translation thereof.
European Patent Office Action dated Mar. 26, 2015 for corresponding Application No. 11 711 754.9-1870.
International Search Report for PCT/DK/2011/050092 dated Mar. 21, 2011.
www.serial3994.homeautomationexperts.com.
Danish Search Report dated Nov. 9, 2010 issued in Danish Application No. PA 2010 70122.

* cited by examiner

METHOD FOR PROVIDING DATA FROM A RESOURCE WEAK DEVICE TO A COMPUTER CLIENT

CROSS-REFERENCE TO RELATED APPLICATIONS

This U.S. non-provisional application is a continuation-in-part under 35 U.S.C. § 120 of U.S. application Ser. No. 13/636,266, filed on Dec. 28, 2012, which claims priority under 35 U.S.C. § 365 to International Application No. PCT/DK2011/050092, filed on Mar. 21, 2011, which claims priority under 35 U.S.C. § 119 to DK Patent Application No. 201070122, filed on Mar. 23, 2010 with the Danish Patent and Trademark Office (DKPTO), the entire contents of each of which are hereby incorporated herein by reference.

BACKGROUND

Field

The invention relates to a method for providing data from a re-source weak device to a computer client connected to the resource weak device, wherein data communicated from the resource weak device to the computer client is mapped from a first data format into a second data format, allowing the computer client to receive and send data to and from the resource weak device.

Related Art

In the recent years more and more everyday devices have been provided with microprocessors and communication means, allowing them to communicate and being controlled over the Internet. Examples of such devices are smart home power sockets, smart home heating system, televisions, refrigerators, web-cameras, lighting system etc. The integration of computer processing capabilities and communication means into such devices has opened the door for a new world of possibilities. A user may control the heating system of his holiday home over the Internet, to allow the holiday home to be heated when he arrives, or a user may check his refrigerator for food over the Internet prior to doing grocery shopping.

Web browsers running on clients such as personal computers, PDAs or mobile phones are an efficient and easy tool for users to communicate with their devices. Web browsers simply interpret information provided from servers on the Internet such as HTML pages comprising pictures and Java applets and display the content in a graphical user interface such as a computer screen. Internet users are very familiar using web browsers and the web browser as an application is therefore a very important tool for providing access to content made available on the Internet. Due to the popularity of web browsers, their functionality has been extended to include features such as FTP file transfer and reading RSS feeds in order to make this widespread application even more suitable for accessing content and information made available on the Internet.

WO2009/103291 discloses a method and a system for identifying and connecting clients connected to the same network. The system comprises a control server for performing the steps of connecting a first client running a web browser application to the control server and registering client specific connection information associated with the first client. Receiving from the web browser application a request for an unique URI defined by the control server and associated with a second client, requesting the control server to mediate a connection to the second client associated with the unique URI and receiving data from the second client on the direct connection and forwarding the data to the web browser application for displaying the received data in a graphical user interface.

U.S. Pat. No. 6,112,246 discloses a server equipped network device controlling and accessing information from a remote device separate from the server equipped network device, which server equipped network device is adapted to publish a web page to be transmitted to a computer client by using HTTP. The server equipped network device comprises a control and access component conducting the communication with and control of the remote device and providing information about the remote device to a server component publishing the web page to be transmitted to the computer client.

However, the implementation of such solutions are based on the assumption that the clients involved have processing power and storage capacity available for establishing a communication connection, conducting the following communication, process and communicate the specific data of the client to other clients. Hence, such solutions are based on the assumption that clients are server equipped network device having storage and processing capabilities for running a server for providing data for other clients.

SUMMARY

It is a purpose of the present invention to provide a system and a method for transmitting data between a computer client and network device with limited processing and storage capabilities. And it is in particular a purpose to perform such transmission of data by utilizing exiting hardware and software components.

With a view to this the method according to the present invention is characterized in that a data stream between the resource weak device and the computer client is mapped from a low level data format to a high level data format by a mapping function in the computer client, the mapping function comprises static data relating to the resource weak device and the high level data format link to the static data, the second high level data format is used for displaying the data from the resource weak device at the computer client.

This allows for implementing a web server like functionality using a very limited storage in the range of tens of kilobytes as the processing and logic required to establish a connection and communicating data massages in a low level data format is very limited compared to the processing and storage required when implementing a web server in the prior art. The very limited storage requirement for implementing the web server functionality is highly appreciated because it makes the implementation more feasible and possible in existing resource weak devices, e.g. embedded systems with limited hardware resources. Hence an end user connecting to the resource weak device from the standard computer client, will experience the communication with the resource weak device as if the a web server was implemented in the resource weak device, but by providing the computer client with a mapping function.

Therefore, depending on the nature of the connection between the resource weak device and the computer client, the resource weak device may use as much as 40 to 60% or more of its processing and storage resources communicating with the computer device if the connection is very resource demanding connection such as a wireless network connection, and in the range of 10 to 20% or less if the resource weak device and the computer client is connected directly using a wires connection such as RS232 or USB.

It is an advantage to utilize the available resources of the computer client to implement a web server like functionality that enable the computer client to display en data from the resource weak device, and thereby the high level data format may at least 30%, 50%, 100%, 200% or 1000% times the number of bytes of the low level data format.

A resource weak device is to be understood as a specific purpose computer device such as an embedded system, which with respect to processing and storage resources is configured to conduct a specific task or functionality as a stand alone device or in relation to control and data logging in other equipment. The computer client is to be understood as a general purpose computer client having processing and storage resources available for conducting several different tasks and functionalities, i.e. the computer client may for instance be general purpose computer equipment such as a personal computer, a PDA or a mobile phone.

In a further development of the invention, which takes advantage of existing infrastructure a web browser application of the computer client is used to establish the connection to the resource weak device by using a plug-in.

When implementing the invention by using a web browser and a plug-in it is also possible to easily provide the required mapping function by download from the Internet as an alternative to receiving it from a storage device inserted into or attached to the computer device. It is to be understood that the invention may be implemented as an application on a computer client using an existing web browser as a plug-in to the application implementing the method according to the invention. However, in a preferred embodiment the method according to the invention is implemented by adding a plug-in to exiting web browser in order to implement the web server functionality pertaining to the resource weak device by using the resource available in a computer client.

In an even further development of this preferred embodiment, the plug-in performs the mapping function and the direct communication with the resource weak device.

In an especially advantageous embodiment of the invention, a direct connection between the resource weak device and the computer client is mediated by a control server, preferably by examining several different means of connections.

With the provision of a control server mediating the connection it is possible to establish a connection between the resource weak device and the computer client even of one of the two or both are connected to the Internet, but not directly accessible. Moreover, the control server may be used to provide the computer client with the plug-in and hence the required mapping function and the static data relating to the resource weak device.

In a further development of the use of the control server, the plug-in transmits an identifier associated with the resource weak device to the control server, preferably said identifier is in the form of an URI.

In an even further development of the invention, which provides a utilization of the existing domain name infrastructure, the identifier of the resource weak resource is a domain name address that resolves to the control server.

In a practical embodiment especially suitable for implementing the invention using a web browser, the high level data format is a markup language data format to be interpreted and displayed by a web browser application, i.e. the high level data is for instance HTLM, XML, XHTML or RTF.

In a practical implementation requiring very limited processing resources by the resource weak device, the low level data format is a binary data format.

In a further practical implementation, the static data comprises a number of static data elements such as scripts, images, video and audio.

In a further practical embodiment that allows for a very simple implementation, the mapping function maps from a N bit binary number being the low level data format to HTML code being the high level data format.

In a further development of this simple implementation, the HTLM code links to the static data, resulting in a full web page.

In an embodiment allowing the user of the computer client to control the resource weak device, the mapping function is adapted to convert a user input from the web page into low level data format to be transmitted to the low resource device.

In another embodiment, the computer client is a general purpose computer client and the resource weak device is a specific purpose computer device.

In a practical embodiment allowing the provider of a resource weak device to add new features to an existing system, the control server is adapted to provide the computer client with the client specific data and the mapping function.

In a further development of this embodiment, the control server further comprises an user interface for allowing an administrator to modify functionalities of the mapping function of the first client, preferably to modify the client specific data.

In a practical embodiment allowing the use of a resource weak device for different purpose or for instance to display data indifferent languages, multiple mapping functions and/or multiple client specific data is associated with the resource weak device.

In a further development embodiment, the computer device is adapted to provide reliable logic and the resource weak device is adapted to provide simple stateless request-to-response logic. This will save hardware resources at the resource weak device.

In some embodiments said device further is adapted to search for said mapping function on a local available storage.

Preferably, the method according to the invention is implemented as a system for providing data from a resource weak device to a user of a computer device.

It is furthermore a purpose of the present invention, to provide a method or system for easily making devices having limited resources available over the Internet. Hence a further aspect of the invention relates to a control server is configured for connection to a network, for connecting a first client connected to the network to a second client connected to the network, the control server being adapted to, connecting the first client to the control server and registering first client specific connection information, deriving a mapping function associated with said first client, connecting a second client running an application to said control server, receiving from said application an identifier associated with said first client, making said mapping function available to said second client, and establishing a direct connection between said first client and said second client, wherein said mapping function enables said second client to map a data stream between the first client and the second client between a first data format and a second data format.

The network may be any kind of network such as the Internet, a local area network or even a local area network connected to the Internet. The clients may be any kind of devices such as personal computer, PDA, mobile phones or everyday devices such as home power sockets, home heating system, televisions, refrigerators, web-cameras and lighting systems. The mapping function is adapted to map from a first data format into a second data format. The data formats may be any kind of data formats. In some embodiments the first data format is a low level data format such as binary data and the second data format is a high level data format such as HTML. The client specific connection information may comprise information identifying the client position in the network, such as an IP address and a port number when the network is the Internet. The identifier associated with the first client may be any kind of identifier such as an uniform resource identifier (URI). The control server may serve any number of clients. The mapping function associated with the first client may be stored on the control server before the first client connects to the control server, or the mapping function may be stored another place on the network. The control server may make the mapping function available to the second client by sending the mapping function to the second client, or linking to the mapping function. The direct connection between the first and second client may be established by using Transmission Control Protocol (TCP) or User Datagram Protocol (UDP) hole punching mediated by the control server. In some embodiments the data stream is from the first client to the second client, in some embodiments the data stream is from the second client to the first client, and in some embodiments the data stream is both from the second client to the first client and from the first client to the second client. The data stream may be based on UDP. This format is a very efficient for tiny resource systems (compared to full TCP implementation), however UDP is non-reliable logic. Reliable logic (doing retransmission on loss etc.) is complex.

In some embodiments the second client is adapted to provide reliable logic and the first client is adapted to provide simple stateless request-to-response logic. Thereby resource can be saved on the first client, which may be a resource weak device.

By having a control server mediating direct connection between clients on a network, an easy and efficient way of making devices available over a network such as the Internet is provided. The control server enables devices to communicate over a network without initially knowing their positions in the network. The use of a mapping function makes it possible to decrease the resource requirements for the first client as the protocol for the first client can be coded in a simple data format such as binary.

In some embodiments the control server is adapted to enable the second client to access first client specific data.

The first client specific data may be any kind of data such as graphical data, audio data, or scripts. The graphical data may be any graphical data such as images or videos. The first client specific data is preferably not stored on the first client. The first client specific data may be stored on the control server or on another server/client connected to the network. The first client specific data may be stored on a GUI repository. The first client specific data may be an integral part of the mapping function.

By enabling the second client to access first client specific information not stored on the first client, the resource requirements, such as the storage requirements and bandwidth requirements, of the first client can be further decreased.

In some embodiments the control server may be able to store (cache) certain predefined requests, and/or events that the clients in advance can register/store before the data is needed. The requests, and/or events may be stored in a compact format. Thereby a type of caching is provided that will be very efficient compared to normal "HTML-caching". Further this may enable the second client to get requests from the first client even if the first client is not longer available.

In some embodiments the application is a browser application. The browser application may be any browser application such as Internet Explorer or Firefox.

In some embodiment a plug-in installed in a web browser application of the second client is used for communicating with the control server and establishing a direct connection to the first client mediated by the control server. A plug-in is a easy way to add the new functionality provided by the invention to web browser applications already installed on clients. This furthermore makes it possible to utilize existing technology such as Asynchronous Plugable Protocols for Microsoft Internet Explorer, which are registered in the browser to handle all URIs in the namespace of a new protocol for establishing direct communication between clients.

In some embodiment the control server is adapted to establish a direct connection using a first channel and a second channel, wherein the first channel protocol is adapted to loss less communication and the second channel is adapted for streaming content.

In some embodiments the first client is a resource weak device. A resource weak device may be an embedded device. Examples of resource weak devices may be smart home power sockets, smart home heating system, televisions, refrigerators, web-cameras, lighting system or simple mobile phones. A resource weak device may be a device using at least 10%, 20%, 40% or 60% of the processing resources and/or storage resources of the device for making the device available over a network according to some embodiments of the present invention.

In some embodiments the second client is a resource strong device. A resource strong device may be a device such as personal computers, PDAs or high end mobile phones. A resource strong device may be a device using at most 40%, 10% 5% or 2% of the processing resources and/or storage resources of the device for making the device available over a network according to some embodiments of the present invention.

In some embodiments the first data format is a binary format. In some embodiments the control server establishes the direct connection between said first client and said second client by examining several different means of connections.

The different means of connection means examined may be connections mediated by UDP-holepunching, establishing port-forwarding in the firewalls via Universal Plug and Play (UPNP), or TCP relay (TURN).

In some embodiments the identifier of the first client is a Domain name system (DNS) address that resolves to the control server. Thereby both the first and second client is easily able to locate the control server via DNS. Further, if the application e.g. browser plugin, is not installed, by entering the URI into a web browser, the web browser of the second client may be connected to a web server that may run on the control server which may be able to guide the users through installing the application e.g. plug-in.

In some embodiments the control server further comprises an user interface for allowing an administrator to modify functionalities of the mapping function of the first client. The user interface may be any kind of user interface, such as a special HTML page allowing an administrator access.

By allowing an administrator to alter functionalities of the mapping function, a more flexible system is provided. When the first client is an embedded device such as a smart home power socket, a manufacture of the device may optimise the user interface of the device after the device has been launched, simply by altering the devices mapping function.

In some embodiments, multiple mapping functions and/or multiple client specific data are associated with said first client. Each mapping function and/or client specific data, may relate to a given language. Thereby a user may select a language prior to communicating with an embedded device. This will further increase the flexibility and user-friendliness of the system.

In some embodiments the client specific data comprises graphical data.

In some embodiments the number of bytes of the second data format is at least 30%, 50%, 100%, 200% or 1000% larger than the number of bytes of the first data format.

A even further aspect of the invention relates to a method for connecting a first client connected to a network with a second client connected to said network using a control server, the method comprises the steps of connecting the first client to the control server and registering first client specific connection information, deriving a mapping function associated with said first client, connecting a second client running an application to said control server, receiving from said application a unique identifier associated with said the first client, sending said mapping function associated with said first client to said second client, and establishing a direct connection between said first client and said second client, wherein said mapping function enables said second client to map a data stream between the first client and the second client between a first data format and a second data format. In some embodiments the steps are performed in the control server.

A further aspect of the invention relates to a device connectable to a network, adapted to communicate with a second device connected to said network, the device running an application and being adapted to, connect with a control server, sending from said application an identifier associated with said the second device, receiving a mapping function associated with said second device from said control server, communicate using a direct connection with said second device, wherein said mapping function enables said device to map a data stream between the device and the second device between a first data format and a second data format.

The local available storage may be a disk, cache, CD/DVD or maybe broadcast on local LAN for others with a mapping function, or ask the second device for a mapping function or even a simplified/partial mapping function.

In some embodiments said device is adapted to be connected to a local area network, said local area network not being connected to the Internet. If the clients are not connected to the Internet, and therefore is not able to transmit and collect information from the controller, but is located on the same local area network the direct connection between the clients is established by other means than through information transmitted through the controller, for example broadcast or multicast mechanisms.

The present invention relates to different aspects, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

In the following detailed description, features and advantages of the present invention will be further elucidated by exemplary embodiments of the present invention, with reference to the appended drawings, wherein.

DETAILED DESCRIPTION

Figure 1:
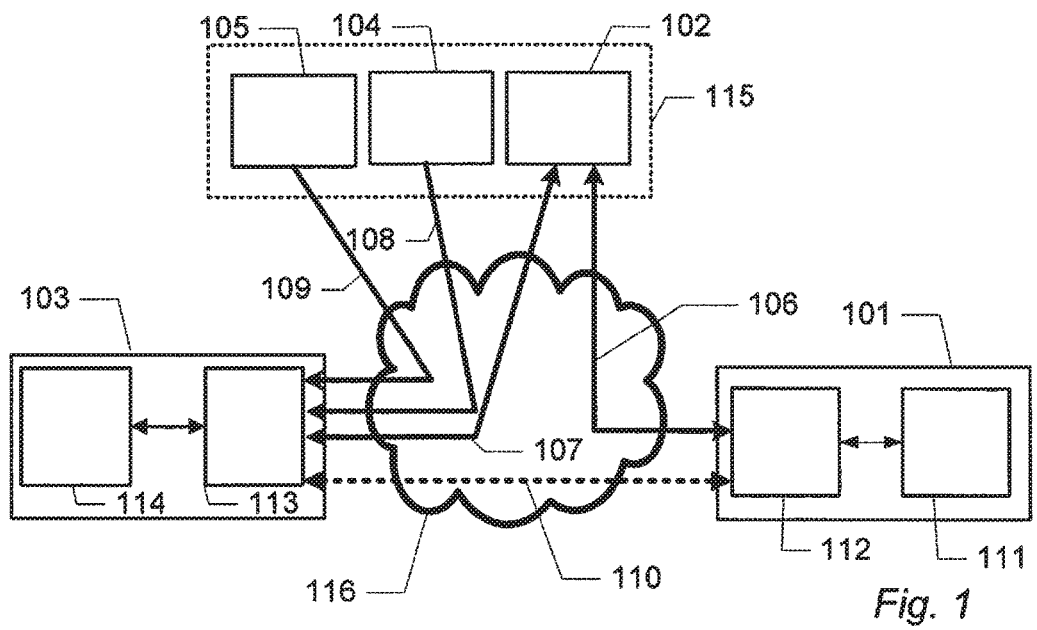
FIG. 1 shows how a direct connection may be mediated by a control server, between a first client in the form of a resource weak device and a second client in the form a resource strong device, according to an embodiment of the present invention.

In FIG. 1 is shown how a direct connection may be mediated by a control server 102 between a first client in the form of a resource weak device 101 and a second client in the form a resource strong device 103, according to an embodiment of the present invention. The control server 102, the resource weak device 101 and the resource strong device 103 are all connected to the same network 116. When the resource weak device 101 connects to the network 116, an application 112 of the resource weak device 101 having stored a network address of the control server 102 establish connection 106 to the control server 102, and register specific connection information e.g. an identifier of the resource weak device 101 and/or a network address such as an IP and an port number of the resource weak device 101. When the resource strong device 103 wants to communicate with the resource weak device 101, an application in the form of a web browser 114 of the resource strong device 103, establish a connection 107 to the control server 102 using a plug-in 113. The plug-in 113 transmits an identifier associated with the resource weak device 101 to the control server, in the form of an URI. In response to the received URI the control server 102 makes a mapping function 104 associated with the resource weak device 101 available to the resource strong device 103, and optionally data 105 associated with the resource weak device 101. The mapping function 104 and the data 105 may be merged together in a single data structure. The mapping function 104 and the data 105 may be stored on the control server 102 or on another server/client connected to the network 116. The mapping function 104 and the data 105 are preferably not stored on the resource weak device 101. This allows the resource requirement of the resource weak device 101 to be lowered. Next the control server 102 mediates a direct connection 110 between the resource weak device 101 and the resource strong device 103. Using the mapping function 104 and optionally the data 105, the data stream between the resource strong device 103 and the resource weak device 101 is mapped from a first data format into a second data format, allowing the resource strong device 103 to receive and send information from and to the resource weak device 101.

Figure 2:
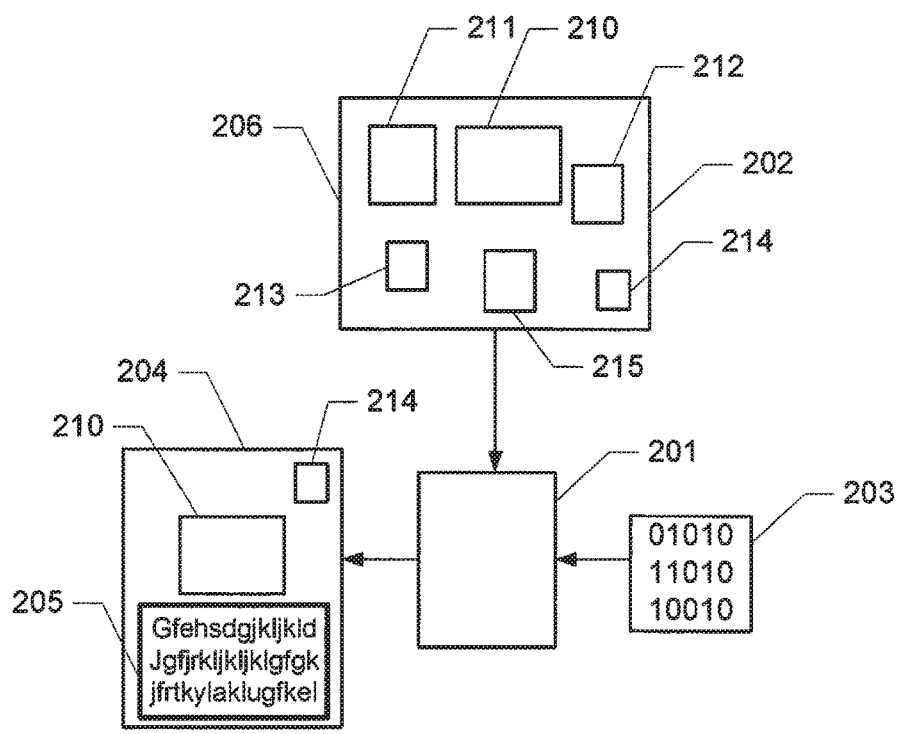
FIG. 2 shows how a mapping function may transform data from a first data format of a first device into a second data format to be interpreted by a second device, according to an embodiment of the present invention.

FIG. 2 shows a mapping function 201 for transforming data from a first data format in the form of binary data 203 origin from a resource weak device, into a second data 205 format in the form of a web page 204 according to an embodiment of the present invention. The number of bits used to code the binary data 203 may be known before hand by the mapping function 201 or alternatively be supplied to the mapping function 201 by a header in the binary data 203. The mapping function 201 is further provided with static data 206 related to the resource weak device. The static data 206 comprise a number of static data elements 210, 211, 212, 213, 214, 215 such as scripts, images, videos and audio. The mapping function 201 maps an N bit binary number into a html code. The mapping function may map from a single N bit binary number into a single HTLM command or into several number of commands or even several number of page of html commands. The resulting HTML document may link to the static data 206, resulting in a full web page 204. Thereby a small number of bytes of binary data 203 send over a low bandwidth connection can be converted into a full web page 204 of possibly several Megabytes. The mapping function 201 may additionally be able to convert a user input from the web page into a binary data format for transmitting to the low resource device.

Figure 3:
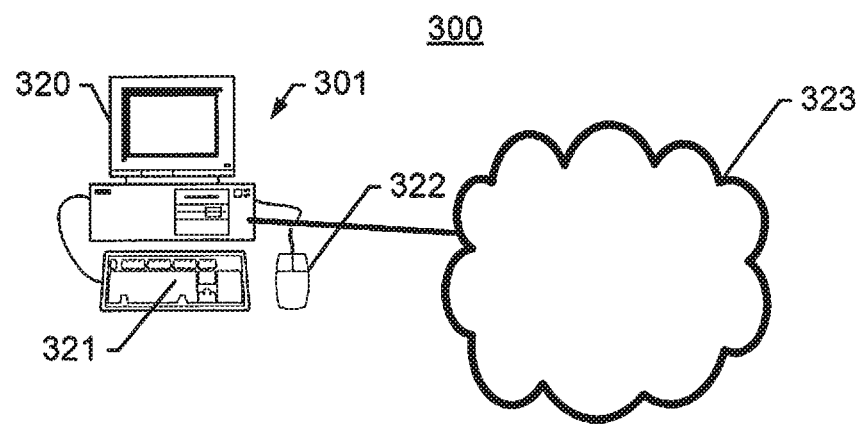
FIG. 3 shows a computer client connected to a computer network according to some embodiments.

FIG. 3 shows a client according to some embodiments. The client is a suitably programmed computer 301, e.g. a personal computer, a workstation, etc., comprising a display 320, a keyboard 321 and a computer mouse 322 and/or another pointing device, such as a touch pad, a track ball, a light pen, a touch screen, or the like. The computer system further comprises a file storage system. The file storing system may comprise the application. The computer system 300 further comprises one or more interfaces for connecting the computer with other clients via a computer network, e.g. the Internet.

The keyboard 321 and/or mouse and/or other input means may be used to provide the control server with an identifier of another client. The display 320 may be used to provide a graphical presentation of data received from another client. The keyboard 321 and/or mouse and/or other input means may be used to communicate with another client.

Figure 4:
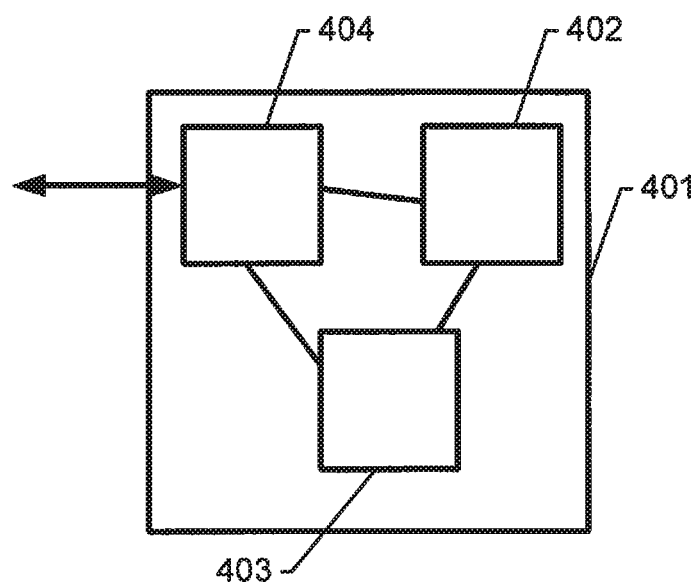
FIG. 4 shows the structure of a computer client or a resource weak device according to the invention.
Figure 5:
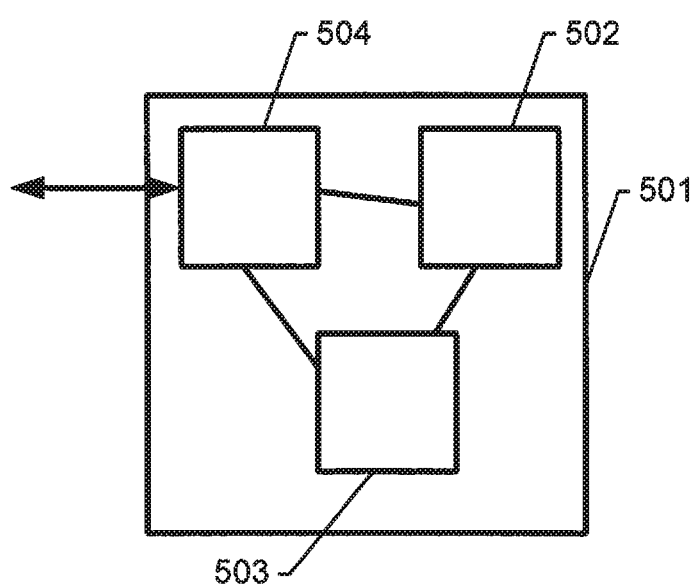
FIG. 5 shows a control server mediating communication connections according to some embodiments of the invention

FIG. 4 shows a device/client 401 according to some embodiments. The device/client comprises a memory unit 402, a processing unit 403 and an interface 404 for connecting the device/client with other device/clients via a computer network FIG. 5 shows a control server 501 according to some embodiments. The control server 501 comprises a memory unit 402, a processing unit 403 and an interface 404 for connecting the control server with other device/clients via a computer network Below is described an embodiment according to the present invention, where a second client being a PC operated by a user wishes to communicate with a first client being the users holiday cottage home automation system. The PC runs an application being a web-browser having extra functionalities added by an installed plug-in.

The identifier of the users holiday cottage home automation system is predefined from the factory to be "serial3994.homeautomationexperts.com". Homeautomationexperts.com (HAE) is the manufacture of the home automation system, and has registered this address to resolve to one of HAE's control servers. Therefore last time when the home automation system did a boot, the home automation system resolved its own predefined address and thereby the control server it has to register with.

Now when the user installed the home automation system, he/she noticed the "serial3994.homeautomationexperts.com" address on the device, and bookmarked it in his/her browser running on his/her PC. Later when he/she types the address into the browser, or uses the predefined bookmark, the browser will acknowledge the URL as a http address resolving the URL to the control server. The control server will examine the browser and if no plug-in is installed, ask and guide the user to install it. Lastly the control server will redirect the user to nabto://serial3994.homeautomationexperts.com. The plugin will get this request through the registering the "nabto://" handler via the Asynchronous Pluggable Protocol API. The plug-in will resolve the URL through DNS, and thereby get the address of the control server. The plug-in will communicate with the control server, and receive URL(s) of a mapping function and data associated with the home automation system. The data being a GUI repository. The plug-in will download the mapping function and the GUI repository. The plug-in will present the static index.html page (normal behavior for /) located in the root folder of the GUI repository. In this page the following link will be present: nabto://serial3994.homeautomationexperts.com/GetTemperaturesensor Since this is what the user need, the user clicks on the link. Next a direct connection is established between the user PC and the home automation system and by using the mapping function, a data stream between the PC and the home automation system is mapped between a first data format and a second data format. Thereby the user is allowed to receive information and control his/her home automation system using his/her PC.

Figure 6:
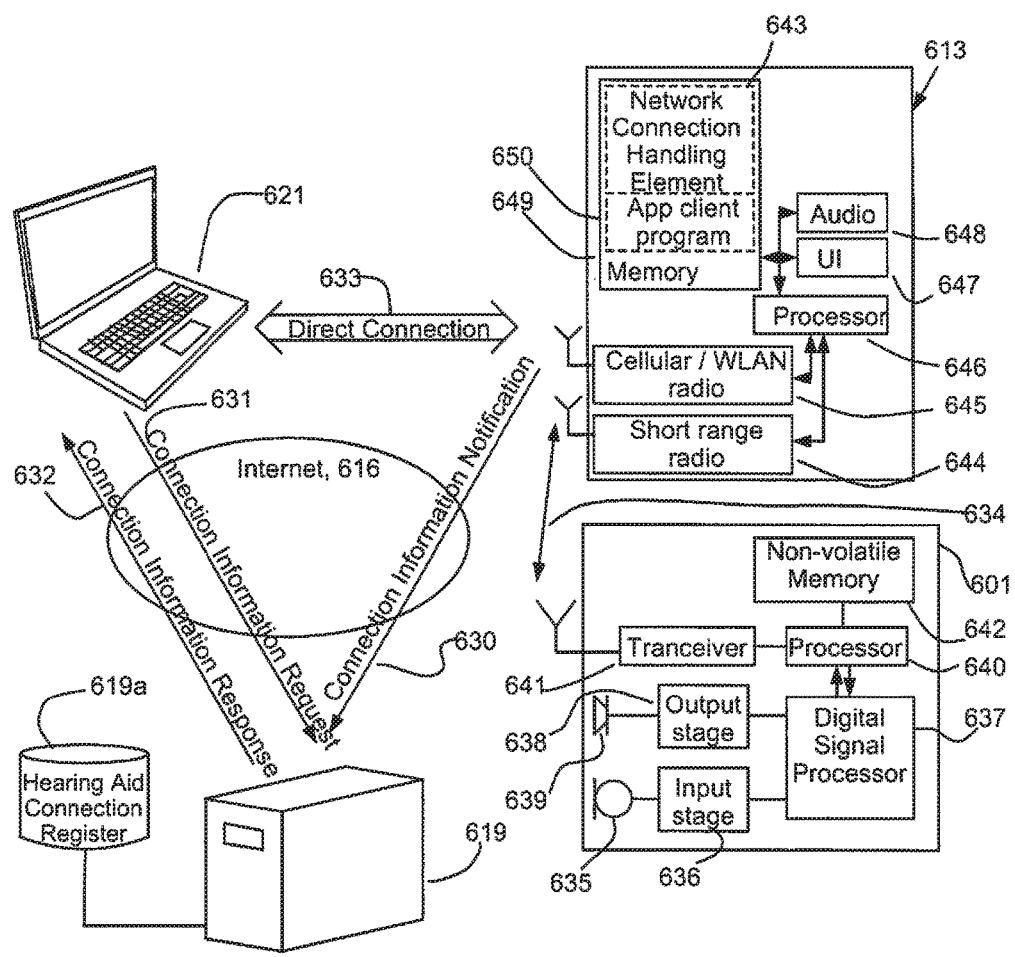
FIG. 6 illustrates schematically a system for providing a network connection to at least one hearing aid according to an embodiment of the invention.

Reference is made to FIG. 6, which schematically illustrates embodiments of the invention for a system for providing a network connection from a computer device 621 to at least one hearing aid 601 having a gateway the Internet 616. Prior to use, the settings of the hearing aid are set and adjusted by a hearing care professional according to a prescription. The prescription is provided by an audiologist and is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit.

Hearing aids are often provided to a hearing impaired user as a set of binaural hearing aids 601. The set of hearing aids 601 have preferably an inter-ear communication channel based on a suitable communication protocol, such as the Bluetooth™ Low Energy protocol. The set of hearing aids 601 communicates preferably with the personal communication device 613, such as a smartphone. When being a smartphone, the personal communication device 613 is preferably Internet enabled which means that it may access the common network, such as the Internet 616 via a wireless Internet connection (e.g. WLAN), or a cellular data connection (e.g. WCDMA or LTE). Advantageously, the personal communication device 613 has the ability to download and launch application software from an app store via the Internet. The term "app" is short for application software, which is a set of one or more programs designed to carry out operations for a specific application. Application software cannot run on itself but is dependent on system software to execute.

In the embodiment shown in FIG. 6, the resource strong device is embodied in a computer device 621. The control server 619 is able to maintain its hearing aid connection register 619a as a look-up table. According to the illustrated embodiment, the resource weak device is embedded in the personal communication device 613 which preferably is a smartphone. The personal communication device 613 includes a processor 646 controlling the operation of audio elements 648 (like a speaker and a microphone) and user interface (UI) elements 647 (like a touch screen or keys and a display). Furthermore the processor 646 controls the operation of a long range radio 645 serving various mobile communication standards and WLAN standards connecting the personal communication device 613 to the Internet 616.

A short range radio 644 connects the personal communication device 613 to the hearing aid 601 by means of the Bluetooth Low Energy protocol. Furthermore, the personal communication device 613 has memory 649 (e.g. EEPROM)—in which a hearing aid control app 650 is stored. The personal communication device 613 is adapted to present the hearing aid control app 650 on a touch screen to the hearing aid user. The hearing aid control app 650 is adapted to offer control elements for the operation of the hearing aid. The hearing aid control app 650 hosts the network connection handling element 643 (corresponding to the first client in the form of a resource weak device 101 in FIG. 1).

The hearing aid 601 comprises the input transducer 635 for picking up the acoustic sound and converting it into electric signals being amplified and converted into a digital signal in the input stage 636. The digital signal is fed to the Digital Signal Processor 637 in which the amplification and conditioning is carried out according to the predetermined setting in order to alleviate a hearing loss by amplifying sound at frequencies in those parts of the audible frequency range where the user suffers a hearing deficit. The output from the Digital Signal Processor 637 is via the output stage 638 fed to the output transducer 639 for reproduction. Furthermore, the hearing aid 601 comprises a processor 640 is connected to the non-volatile memory 642 and to the transceiver 641 for establishing a wireless connection to a gateway to the Internet 616 via the personal communication device 613.

The personal communication device 613 may via the long range radio 645 establish competing Internet connections via the cellular network and via a public hotspot or a router at home. The network connection handling element 643 identifies the current connection information for the Internet connections identified. The network connection handling element 643 detects the presence of the short range communication channel between the personal communication device 613 and the hearing aid 601

When both the short range communication channel and long range communication channel are present, the network connection handling element 643 transmits a connection information notification 630 to the control server 619 whose IP address may be preprogrammed into the network connection handling element 643. The connection information notification 630 provides the unique identity for the hearing aid 601 linked to the current connection information.

The transmission of the connection information notification 630 is trigged by establishing network connection (event) between the hearing aid 601 and the internet 616. Hereby the control server 619 is able to maintain its hearing aid connection register 619a as a look-up table in which the unique identity for the hearing aid 601 may be translated to the current connection information of the network connection handling element 643. The network connection handling element 643 serves several purposes—it monitors status of the hearing aid's connectivity, handles session security, and notifies the current connection information to a hearing aid location register 619a. The network connection handling element 643 may be downloaded to the personal communication device 613 from an app store and stored in a memory of the personal communication device 613.

When a hearing care professional or a monitoring server (M2M—"machine-to-machine"—for data consolidation) needs to exchange or collect data from the hearing aid 601, the specific hearing aid user's user account may be accessed from where the unique identity for the at least one hearing aid 601 in question may be retrieved. When a hearing care professional intends to adjust the setting of a specific hearing aid user's hearing aid 601, he may via the computer device 621 access the specific hearing aid user's user account from where he may retrieve the unique identity for the at least one hearing aid 601 in question. Preferably, the fitting software running on the computer device 621 automatically sends a connection information request 631 from the account based on the unique identity for the at least one hearing aid 601 in question to the control server 619. Based upon a look-up in the hearing aid connection register 619a, the control server 619 responds to the connection information request 631 by sending a connection information response 632 containing the current Internet address of the at least one hearing aid 601 based on the unique identity for the hearing aid 601. Then the fitting software sets up the direct connection 633, preferably using UDP hole punching, to the network connection handling element 643 based on a connection information response 632 from the hearing aid connection register 619a. The direct connection 633 is preferably set up by using UDP (User Datagram Protocol) hole punching (used for setting up connections between Internet hosts in private networks using network address translators) for establishing a bidirectional UDP connection. The computer device 621 sends a direct connection set-up request to the network connection handling element 643. The network connection handling element 643 confirms the request by sending a direct connection set-up confirmation where after the network connection handling element 643 starts to exchange payload in a bi-directional data packet exchange or direct connection operation. The payload may include upload of data from the hearing aid 601, such as logging data and settings, and download of data to the hearing aid 601, such as instruction for adjusting the current settings of the hearing aid 601 (remote fitting). The computer device 621 disconnects the direct connection by sending a direct connection termination instruction to the network connection handling element 643 once the exchange of data packets have been successfully completed.

Figure 7:
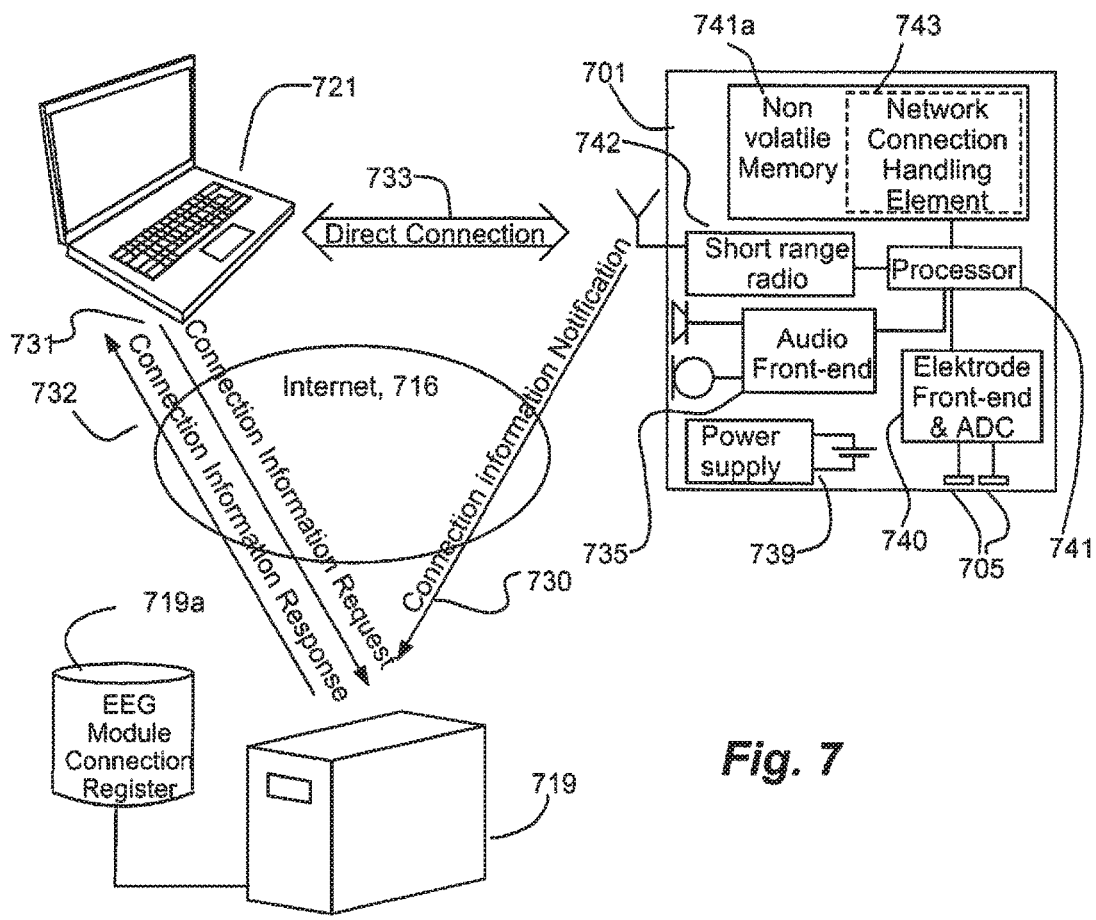
FIG. 7 illustrates schematically a system for providing a network connection to a wearable EEG monitoring module according to an embodiment of the invention.

FIG. 7 illustrates schematically a system for providing a network connection from a computer device 721 to a wearable EEG monitoring module 701 having a gateway the Internet 716. For persons with diabetes accurate control of blood sugar concentration is important. The blood sugar level should not be too high in order to limit the risk of long term effects of diabetes, and not be too low, since this might lead to hypoglycemia, where the person becomes absent and may become unconscious. Hypoglycemic attacks may be fatal, but persons with diabetes do not always feel any pre-warning before the blood sugar concentration has fallen to a level where a hypoglycemic attack occurs. This phenomenon is known as hypoglycemic unawareness. The risk of an attack therefore often limits the possible activities of the people concerned, which furthermore decrease their quality of life. Attacks can be prevented in a simple way, e.g. by consuming appropriate food when glucose values become critically low. Therefor the embodiment according to FIG. 7 provides remote access to the wearable EEG monitoring module 701 allowing medical care professionals to retrieve logging data for analyzing the patient data and adjusting settings for the wearable EEG monitoring module 701 according to the analyzed patient data.

The electronic components of the wearable EEG monitoring module 701 include a power supply 739 based upon a standard hearing aid battery for powering the electronics. The two electrodes 705 provided on the surface of the wearable EEG monitoring module 701 pick up a potential and delivers the data via a module 740 operating as electrode frontend and Analog to Digital Converter (ADC) to a controller 741. The controller 741 has a volatile memory 741*a* and receives the amplified and digitized signal for processing. The controller 741 analyses the EEG signal picked up for detecting hypoglycemia by monitoring the brain wave frequency, and if the brain wave frequency falls beyond a predefined interval, this may indicate that a medical emergency may arise. Hypoglycemia is a medical emergency that involves an abnormally diminished content of glucose in the blood. Upon detection of abnormal brain wave activities, the controller 741 provides an alert for the patient via an audio front-end module 735 including a microphone and a speaker. With the microphone, the controller 741 is able to pick up audio samples and classify the current sound environment. The EEG monitoring module 701 uses short range radio 742 for establishing a wireless connection to the Internet 716 via a gateway formed by a personal communication device, a router (e.g. WLAN) in a private domain or a hotspot in a public domain. The controller 741 adjusts the predefined interval for normal brain wave activity in correlation to the real time clock information and the sound environment classification. With the speaker, the controller 741 is able to alert the wearer of the wearable EEG monitoring module 701 that a medical emergency may arise and that precautionary actions have to be taken.

The EEG monitoring module 701 comprises a network connection handling element 743 (corresponding to the first client in the form of a resource weak device 101 in FIG. 1) is embedded into the EEG monitoring module before it leaves the factory, and some elements may be stored in the non-volatile memory 741*a* and some elements as security elements and certificates in a non-editable memory. The network connection handling element 743 serves several purposes—it monitors status of the connectivity of the EEG monitoring module 701, handles session security, and notifies the current connection information to the EEG module connection register 719*a*. The network connection handling element 743 detects when a new network connection to the EEG monitoring module 701 has been established—e.g. a connection to a hotspot or to a router in the private domain, and when the current connection information has been identified, the network connection handling element 743 transmits connection information notification 730 over the Internet 716 to the control server 719. The address of the control server 719 is advantageously preprogrammed into the network connection handling element 743. The connection information notification 730 provides a unique identity for the EEG monitoring module 701 linked to its current connection information. The transmission of the connection information notification 730 is trigged by an event, e.g. the establishment of a connection to the Internet via a gateway. Hereby the control server 719 is able to maintain its EEG module connection register 719*a* as a look-up table in which the unique identity for the EEG monitoring module 701 may be translated to the current connection information of the EEG monitoring module 701.

The invention is advantageous when a medical care professional, during a remote EEG surveillance for minimizing the risk of an imminent hypoglycemic seizure, analyzes log data from the wearable EEG monitoring module 701—either in response to an alarm or in a scheduled session where the patient data are analyzed regularly in order to detect anomaly. This could be data or information on incidences where an alarm has almost been triggered but was prevented. Prevention of an alarm could take place if the person under EEG surveillance was eating or drinking, thereby increasing the blood sugar concentration, just before the alarm would have been triggered. Also data indicating the physical status of the person, e.g. sleeping or awake, could be transferred.

The remote EEG surveillance includes manipulation of a remote wearable EEG monitoring module 701, and this manipulation may include remote control of the wearable EEG monitoring module 701—e.g. remote switching between day, night or exercise mode for the module; data logging of data captured by the wearable EEG monitoring module 701; and setting of operational parameters for EEG sensing, e. g. thresholds for the alarm function.

When a medical care professional needs to manipulate the setting of the EEG monitoring module 701, he may via the computer device 721 access the patient record from a patient record database (preferably a centrally operated outpatient Electronic Medical Record (EMR) system) from where he may retrieve the unique identity for the wearable EEG monitoring module 701 in question. Preferably the surveillance software running on the computer device 721 automatically sends a connection Information request 731 from the account based on the unique identity for the wearable EEG monitoring module 701 in question to the control server 719. Based upon a look-up in the EEG Module Connection Register 719*a*, the control server 719 responds to the connection Information request 731 by sending a connection information response 732 containing the current connection information of the wearable EEG monitoring module 701 based on the unique identity stored in the patient record.

The computer device 721 then starts to set up a direct connection 733 preferably using UDP (User Datagram Protocol) hole punching (used for setting up connections between Internet hosts in private networks using network address translators) for establishing a bidirectional UDP connection. The computer device 721 sends a direct connection set-up request to the network connection handling element 743, and if the EEG monitoring module 701 is still on-line, the network connection handling element 743 confirms the request by sending a direct connection set-up confirmation. Hereafter, the computer device 721 and the network connection handling element 743 start to exchange payload in a bi-directional data packet exchange or direct connection operation. The payload may include upload of data from the EEG monitoring module 701, such as logging data and settings, and download of data to the EEG monitoring module 701, such as instruction for remote control of the wearable EEG monitoring module 701. The computer device 721 disconnects the direct connection by sending a direct connection termination instruction to the network connection handling element 743 once the exchange of data packets have been successfully completed.

The connection information includes the current IP address of the EEG monitoring module 701. Furthermore, the connection information may also include the port number of the EEG monitoring module 701, as an IP address is always associated with a port of the host. The port is the endpoint of communication in the host's operating system. In some situations it may be advantageous to identify the protocol type of the communication in the connection information.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

What is claimed is:

1. A method for exchanging data between a first resource weak device and a resource strong device via a computer network comprising:
    associating the resource strong device with a data storage including a database containing data for a plurality of resource weak devices including respective identifiers of the plurality of resource weak devices;
    providing in a control server a look-up table linking the respective identifiers of the plurality of resource weak devices with associated dynamic network addresses, the control server updating the associated dynamic network address when receiving an update from the respective resource weak device, the respective resource weak device transmitting the update to the control server following a change in the dynamic network address of the respective resource weak device;
    connecting a first resource weak device of the plurality of resource weak devices to the computer network;
    registering specific connection information including the identifier of the first resource weak device and the dynamic network address of the first resource weak device;
    transmitting, from the resource strong device, a request to the control server to provide the specific connection information of the first resource weak device based on the identifier of the resource weak device; and
    wherein the resource strong device establishes a connection to the first resource weak device based on the specific connection information received from the control server, and receives information related to the first resource weak device from the first resource weak device over the connection.

2. The method according to claim 1, wherein the resource strong device is a general purpose computer client including a browser with a plug-in configured to transmit an identifier associated with the first resource weak device to the control server.

3. The method according to claim 2, wherein data communicated from the first resource weak device to the resource strong device is mapped from a low level data format to a high level data format by a mapping function.

4. The method according to claim 3, wherein the mapping function is configured to convert a user input from a web page of the browser into the low level data format to be transmitted to the first resource weak device.

5. The method according to claim 1, wherein the first resource weak device is a specific purpose network enabled computer device.

6. The method according to claim 1, wherein the first resource weak device is included in a body-worn apparatus, and wherein the exchanged data between the first resource weak device and the resource strong device includes transmitting control data from the resource strong device, the resource strong device being configured to control an operation of the body-worn apparatus based on the control data.

7. The method according to claim 1, wherein the first resource weak device is included in a body-worn apparatus, and wherein the exchanged data between the first resource weak device and the resource strong device includes loading log data from the first resource weak device to the resource strong device.

8. The method according to claim 1, wherein a body-worn apparatus including the first resource weak device is a hearing aid.

9. The method according to claim 8, wherein a hearing healthcare professional programs the hearing aid during a fitting session using a computer client having a browser, the browser including a plug-in that is configured to:
    transmit the identifier associated with the first resource weak device to the control server;
    establish the connection between the first resource weak device and the resource strong device based on the specific connection information received from the control server; and
    transmit control data to the first resource weak device for controlling an operation of a body-worn apparatus.

10. The method according to claim 1, wherein a body-worn apparatus including the first resource weak device is an EEG monitoring device.

11. The method according to claim 10, wherein a medical healthcare professional operates the EEG monitoring device during a surveillance session using a computer client having a browser, the browser including a plug-in configured to:
    transmit the identifier associated with the first resource weak device to the control server,
    establish the connection between the first resource weak device and the resource strong device based on the specific connection information received from the control server, and
    retrieve log data sensed by the EEG monitoring device.

12. The method according to claim 1, wherein the connection between the resource strong device and the resource weak device is established using UDP-hole punching, or port-forwarding in at least one firewall using Universal Plug and Play (UPNP).

13. A system for exchanging data between a first resource weak device and a resource strong device via a computer network, the resource strong device is associated with a data storage including a database including data for a plurality of resource weak devices, the data including respective identifiers of the plurality of resource weak devices, the system comprising:
    a control server including a look-up table linking respective identifiers of the plurality of resource weak devices with associated dynamic network addresses of the plurality of resource weak devices, the control server configured to update the associated dynamic network address when receiving an update from the respective resource weak device, the respective resource weak device configured to transmit the update to the control server following a change in the dynamic network address of the respective resource weak device;

the first resource weak devices configured to,
connect to the computer network,
register specific connection information, including the identifier and the dynamic network address of the first resource weak device, with the control server; and the resource strong device is configured to,
transmit a request to the control server to provide the specific connection information of the first resource weak device based on the identifier of the first resource weak device, and
wherein the resource strong device establishes a connection to the first resource weak device based on the specific connection information received from the control server, and receives information related to the first resource weak device from the first resource weak device over the connection.

14. The system according to claim 13, wherein the resource strong device is a general purpose computer client including a browser with a plug-in configured to transmit an identifier associated with the first resource weak device to the control server.

15. The system according to claim 13, wherein the first resource weak device is a specific purpose network enabled computer device.

16. The system according to claim 13, wherein the first resource weak device is included in a body-worn apparatus, and wherein the exchanged data between the first resource weak device and the resource strong device includes transmitting control data from the resource strong device, the resource strong device being configured to control an operation of the body-worn apparatus based on the control data.

17. The system according to claim 13, wherein the first resource weak device is included in a body-worn apparatus, and wherein the exchanged data between the first resource weak device and the resource strong device includes loading log data from the first resource weak device to the resource strong device.

18. The system according to claim 16, wherein the body-worn apparatus including the first resource weak device is a hearing aid.

19. The system according to claim 17, wherein the body-worn apparatus including the first resource weak device is an EEG monitoring device.

20. The system according to claim 16, wherein the first resource weak device is connected to the computer network via an Internet enabled personal communication device acting as a gateway for the first resource weak device.

21. The system according to claim 17, wherein the body-worn apparatus including the resource weak device is a hearing aid.

22. The system according to claim 17, wherein the first resource weak device is connected to the computer network via an Internet enabled personal communication device acting as a gateway for the first resource weak device.

23. The system according to claim 13, wherein the connection between the resource strong device and the resource weak device is established using UDP-hole punching, or port-forwarding in at least one firewall using Universal Plug and Play (UPNP).

* * * * *

UNITED STATES PATENT AND TRADEMARK OFFICE
CERTIFICATE OF CORRECTION

PATENT NO. : 10,244,033 B2
APPLICATION NO. : 15/046772
DATED : March 26, 2019
INVENTOR(S) : Peter Grimstrup and Ulrik Gammelby Page 1 of 1

It is certified that error appears in the above-identified patent and that said Letters Patent is hereby corrected as shown below:

On the Title Page

Foreign Application Priority Data is missing. Please insert the following:
--March 23, 2010 (DK) ........................ PA 2010 70122--

Signed and Sealed this
Twenty-sixth Day of May, 2020

Andrei Iancu
*Director of the United States Patent and Trademark Office*